US012153375B2

(12) United States Patent
Sasaoka et al.

(10) Patent No.: US 12,153,375 B2
(45) Date of Patent: Nov. 26, 2024

(54) IMAGE FORMING APPARATUS HAVING SPACE EFFICIENT AIR BLOWING CAPABILITY

(71) Applicant: CANON KABUSHIKI KAISHA, Tokyo (JP)

(72) Inventors: Osamu Sasaoka, Kanagawa (JP); Toshiyuki Watanabe, Kanagawa (JP); Akinori Yokota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/210,198

(22) Filed: Jun. 15, 2023

(65) Prior Publication Data

US 2023/0418223 A1 Dec. 28, 2023

(30) Foreign Application Priority Data

Jun. 22, 2022 (JP) ................................ 2022-100482

(51) Int. Cl.
*G03G 21/20* (2006.01)
*G03G 15/20* (2006.01)

(52) U.S. Cl.
CPC ....... *G03G 21/206* (2013.01); *G03G 15/2017* (2013.01); *G03G 15/2064* (2013.01); *G03G 2221/1645* (2013.01)

(58) Field of Classification Search
CPC ............. G03G 21/206; G03G 15/2017; G03G 15/2064; G03G 2221/1645
See application file for complete search history.

(56) References Cited

U.S. PATENT DOCUMENTS

| | | | | |
|---|---|---|---|---|
| 10,990,061 | B2 | 4/2021 | Kawasumi | |
| 2014/0294474 | A1* | 10/2014 | Akatsuka | G03G 21/206 399/341 |
| 2016/0313694 | A1* | 10/2016 | Wakimoto | G03G 15/2017 |
| 2018/0246445 | A1* | 8/2018 | Yamashita | G03G 15/2064 |
| 2018/0335750 | A1* | 11/2018 | Yoshimune | G03G 21/18 |
| 2021/0034011 | A1* | 2/2021 | Ohta | G03G 21/206 |

FOREIGN PATENT DOCUMENTS

| | | | |
|---|---|---|---|
| JP | 2001-122490 | A | 5/2001 |
| JP | 2007-062850 | A | 3/2007 |
| JP | 2014-133193 | | 7/2014 |
| JP | 2016-033545 | A | 3/2016 |
| JP | 2019-191400 | A | 10/2019 |

* cited by examiner

*Primary Examiner* — Sandra Brase
(74) *Attorney, Agent, or Firm* — VENABLE LLP

(57) ABSTRACT

An image forming apparatus includes a sheet discharge unit having a rotary unit disposed downstream of a fixing nip in a sheet conveyance direction and discharging the sheet to outside of the image forming apparatus. The rotary unit includes bodies to abut the sheet which are disposed side by side in a width direction orthogonal to the sheet conveyance direction. A stacking unit stacks the sheet discharged by the sheet discharge unit, a fan blows air and includes a rotation shaft extending in the width direction, and a duct discharges the air toward the stacking unit. The rotary unit is disposed such that at least a part of the rotary unit enters an inside of the duct, and with respect to the width direction, at least a part of a first area in which the fan is disposed overlaps a second area in which the rotary unit is disposed.

18 Claims, 8 Drawing Sheets

IMAGE FORMING APPARATUS HAVING SPACE EFFICIENT AIR BLOWING CAPABILITY

BACKGROUND OF THE INVENTION

Field of the Invention

The present invention relates to an image forming apparatus that forms an image on a sheet.

Description of the Related Art

JP 2007-062850 A proposes an image forming apparatus that transfers a toner image to a sheet and fixes the transferred toner image to the sheet by heating and pressurizing the toner image in a fixing unit. The image forming apparatus includes a conveyance roller pair disposed downstream of the fixing unit in the sheet conveyance direction, and an air blowing device that blows air to a pinch roller of the conveyance roller pair to cool the pinch roller. The air blowing device includes a fan and a duct that guides air sent from the fan to the pinch roller. The duct is provided with an upstream opening, air is also sent from the upstream opening to a conveyance path, and the sheet conveyed through the conveyance path is also cooled. By cooling the pinch roller and the sheet with air in this manner, gloss unevenness is suppressed from being formed on the sheet.

However, as described in JP 2007-062850 A, when air is also sent into the conveyance path, ultra fine particles (UFP) generated from the toner image on the fixing unit or the sheet are discharged to the outside of the apparatus via the conveyance path. It is known that the ultra fine particles are generated by applying heat to a toner wax, silicone rubber of a heating roller used in the fixing unit, or the like.

SUMMARY OF THE INVENTION

According to one feature of the present invention, an image forming apparatus includes an image forming unit configured to form a toner image on a sheet, a heating unit including a heating element, and a heating rotary member configured to incorporate the heating element and to be rotatable, a pressurizing rotary member configured to form, together with the heating unit, a fixing nip that fixes the toner image formed by the image forming unit to the sheet, a sheet discharge unit including a rotary member disposed downstream of the fixing nip in a sheet conveyance direction and configured to abut on the sheet, the sheet discharge unit discharging the sheet to an outside of the image forming apparatus, a stacking unit configured to stack the sheet discharged by the sheet discharge unit, a fan configured to blow air, and a duct configured to discharge the air sent by the fan toward the stacking unit. The rotary member is disposed such that at least a part of the rotary member enters an inside of the duct.

Further features of the present invention will become apparent from the following description of exemplary embodiments with reference to the attached drawings.

DESCRIPTION OF THE EMBODIMENTS

First Embodiment

Overall Configuration

Figure 1:
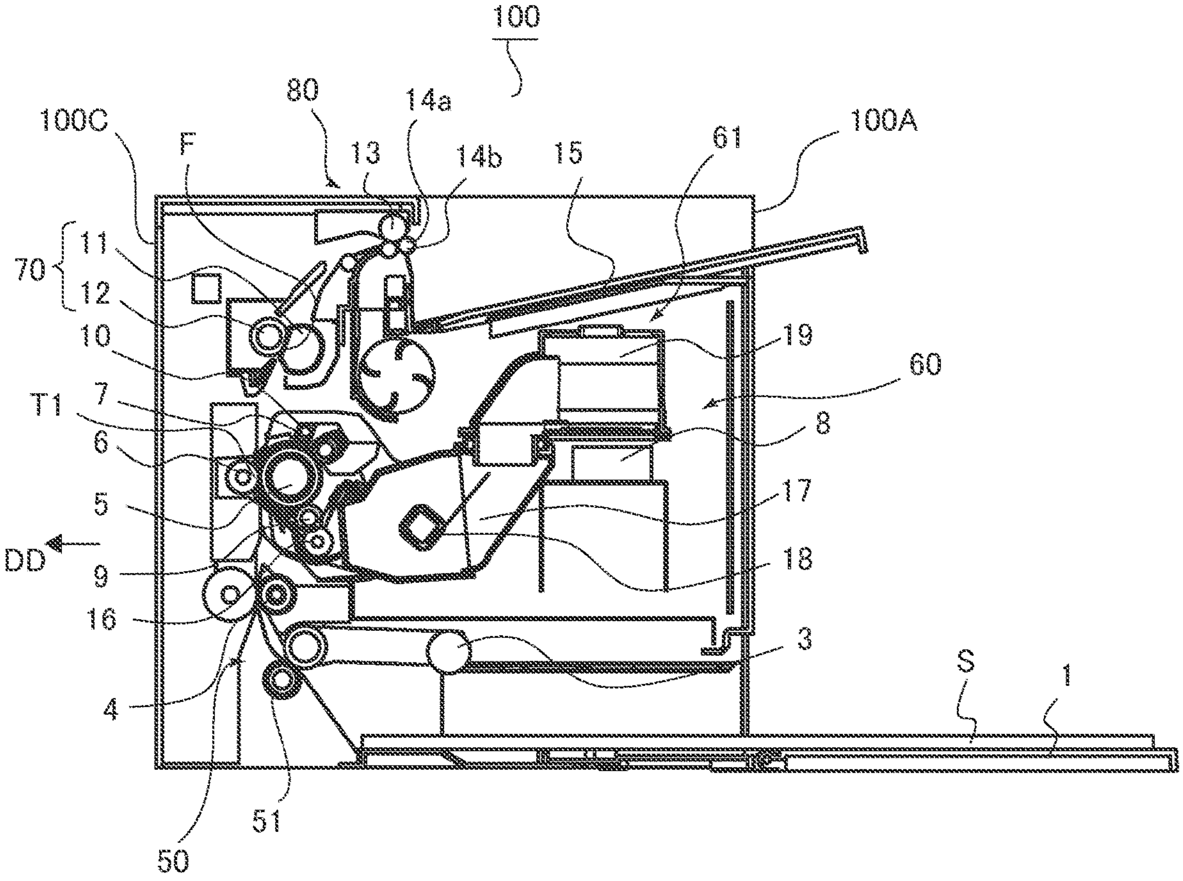
FIG. 1 is an overall schematic view illustrating a printer according to a first embodiment.

A printer 100 serving as an image forming apparatus according to a first embodiment is a laser beam printer of an electrophotographic system that forms a monochrome toner image. As illustrated in FIG. 1, the printer 100 includes a sheet feeding unit 50 that feeds a sheet, an image forming unit 60 configured to form an image on the fed sheet, a fixing unit 70, and a sheet discharge unit 80.

When an image forming command is output to the printer 100, an image forming process by the image forming unit 60 is started based on image information input from an external computer or the like connected to the printer 100. The image forming unit 60 includes a process cartridge 61, a laser scanner 8, and a transfer roller 6.

The process cartridge 61 includes a rotatable photosensitive drum 5, a charge roller 7, a developing roller 9, and an exposure member 10 disposed along the photosensitive drum 5, a supply roller 16, and a developer container 17. The developer container 17 serving as a storage unit stores a toner, and rotatably supports a stirring device 18 that stirs the toner in the developer container 17. The stirring device 18 is driven by a driving source (not illustrated) and rotates to supply the toner to the supply roller 16. Then, the supply roller 16 supplies the toner to the developing roller 9.

In addition, a replenishing port 19 for replenishing a toner from the outside is formed in the developer container 17. A user can expose the replenishing port 19 by opening a sheet discharge tray 15 or a lid (not illustrated) provided on the sheet discharge tray 15. Then, the user can refill the developer container 17 with the toner by inserting a toner container containing the toner into the replenishing port 19.

The transfer roller 6 forms a transfer nip Ti together with the photosensitive drum 5. In the present embodiment, the printer 100 is a monochrome laser beam printer, but is not limited thereto. For example, the printer 100 may be a full color laser beam printer.

The laser scanner 8 irradiates the photosensitive drum 5 with laser light based on input image information. At this time, the photosensitive drum 5 is charged in advance by the charge roller 7, and an electrostatic latent image is formed on the photosensitive drum 5 by being irradiated with laser light. Thereafter, the electrostatic latent image is developed by the developing roller 9, and a monochrome toner image is formed on the photosensitive drum 5.

In parallel with the above-described image forming process, a sheet is fed from the sheet feeding unit 50. The sheet feeding unit 50 includes a feeding tray 1 on which a sheet S is stacked, a pickup roller 3, and a separation roller pair 51. The feeding tray 1 is supported so as to be openable and closable with respect to a casing 100A of the printer 100, forms a part of the exterior of the front surface of the printer 100 in the closed state, and becomes in the open state so that the user can access a sheet storage space inside the casing 100A. Note that the feeding tray 1 may not be configured to rotate, but may be configured to slide to be stored in and pulled out of the casing 100A. The casing 100A detachably supports the process cartridge 61.

The pickup roller 3 rotates in response to an image forming command, and the sheets S supported by the feeding tray 1 are fed by the pickup roller 3. The sheets S fed by the pickup roller 3 are separated one by one by the separation roller pair 51. Instead of the pickup roller 3, the sheet S may be fed by a belt or the like.

The sheets S separated one by one are conveyed to a registration roller pair 4, and skew feeding is corrected by the registration roller pair 4. The toner image on the photosensitive drum 5 is transferred to the sheet S conveyed at a predetermined conveyance timing by the registration roller pair 4 at the transfer nip Ti by an electrostatic load bias applied to the transfer roller 6. Since a potential of the photosensitive drum 5 after transfer varies, the potential is set to a predetermined value by the exposure member 10, and charge for an image to be formed on the next sheet is prepared.

Predetermined heat and pressure are applied to the sheet S to which the toner image has been transferred in a fixing nip F formed by a heating unit 11 and a pressurizing roller 12 of the fixing unit 70, and the toner is fused and fixed. The sheet having passed through the fixing unit 70 is discharged to the sheet discharge tray 15 serving as a stacking unit by the sheet discharge unit 80.

The sheet discharge unit 80 includes a driving roller 13 driven by a driving motor (not illustrated) serving as a driving source, and two driven rollers 14*a* and 14*b* that are driven to rotate by the driving roller 13. Since the two driven rollers 14*a* and 14*b* form a nip with respect to the driving roller 13, the sheet discharge unit 80 has a function of correcting the sheet S curled in the fixing unit 70. In the present embodiment, the sheet discharge unit 80 includes the two driven rollers 14*a* and 14*b*, but is not limited thereto, and may include, for example, only one driven roller.

Configuration of Fixing Unit

Figure 2:
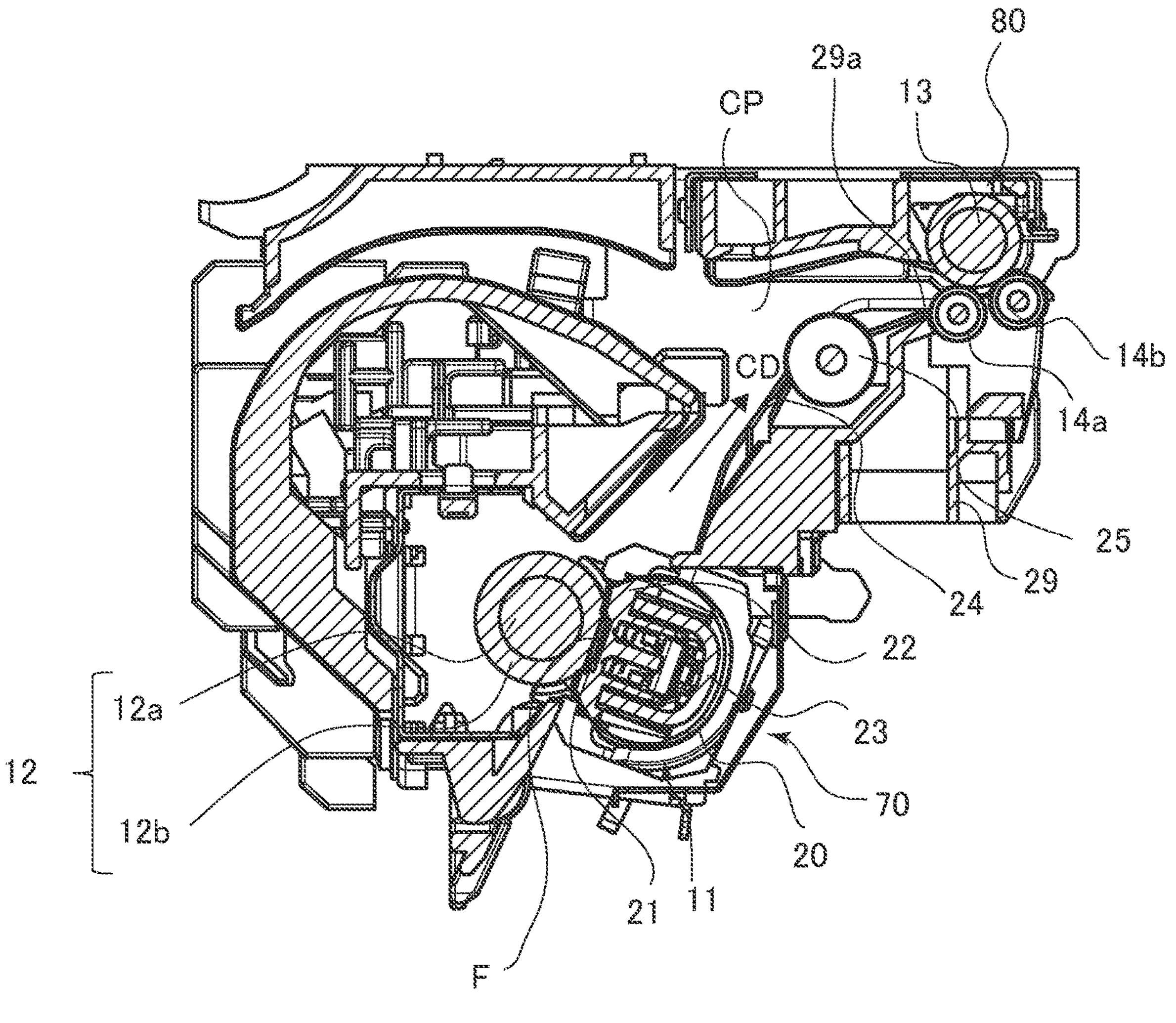
FIG. 2 is a cross-sectional view illustrating a fixing unit and a sheet discharge unit.

Next, a configuration of the fixing unit 70 will be described with reference to FIG. 2. As illustrated in FIG. 2, the fixing unit 70 includes the heating unit 11 and the pressurizing roller 12. The heating unit 11 includes a cylindrical fixing film 20, a heater 21 that internally contacts the fixing film 20 and generates heat, a holder 22 that holds the heater 21, and a stay 23 that guides the fixing film 20.

The fixing film 20 is made of, for example, a thin cylindrical plastic film having high heat resistance and high thermal conductivity. The heater 21 is, for example, a heating element that generates heat by energization by a power source (not illustrated) by applying a conductor on a ceramic base material. The heater 21 is supported in a state of being fitted and fixed to a groove portion of the holder 22. The fixing film 20 is attached so as to cover the outer peripheries of the heater 21, the holder 22, and the stay 23, and can perform rotational motion. That is, the fixing film 20 serving as a heating rotary member is configured to incorporate the heater 21 and to be rotatable.

The heating unit 11 is configured to pressure contact the pressurizing roller 12 by receiving a force of a pressurizing spring (not illustrated). The pressurizing roller 12 serving as a pressurizing rotary member includes a core metal 12*a* and an elastic layer 12*b* formed in a roller shape on the outer periphery of the core metal 12*a*. Since the outer peripheral surface of the pressurizing roller 12 formed by the elastic layer 12*b* has elasticity, the fixing nip F having a predetermined width is formed by the heating unit 11 and the pressurizing roller 12 by allowing the heating unit 11 and the pressurizing roller 12 to contact each other at a predetermined pressure. Further, the pressurizing roller 12 is rotationally driven at a predetermined peripheral speed by driving force received from a driving train (not illustrated). Frictional force is generated between the fixing film 20 and the pressurizing roller 12 by rotation of the pressurizing roller 12, and the fixing film 20 is rotated following the pressurizing roller 12.

In a state where the pressurizing roller 12 and the fixing film 20 are rotated and the heater 21 is energized and heated, the sheet S carrying an unfixed toner image is introduced into the fixing nip F, and the same is nipped and conveyed. In the process in which the sheet S is conveyed by the fixing nip F, the heat of the heater 21 is applied to the sheet S via the fixing film and the unfixed toner image is heated and pressurized to be fused and fixed to the sheet S.

The sheet S conveyed in a sheet conveyance direction CD by the fixing nip F is guided to the sheet discharge unit 80 through a conveyance path CP by a guide member 24 and a pre-discharge roller 25. The pre-discharge roller 25 is rotatably supported by the guide member 24, and reduces frictional force between the guide member 24 and the sheet S by contacting the sheet S and rotating following the sheet S. For example, when the conveyance speed of the sheet S by the sheet discharge unit 80 is faster than the conveyance speed of the sheet S by the fixing unit the image surface of the sheet S on which the toner image is formed is strongly rubbed against the guide member 24. In this case, since an image defect such as a loss of the toner image on the image surface may occur, the sheet S is smoothly guided by the guide member 24.

Air Blowing Configuration

Figure 3:
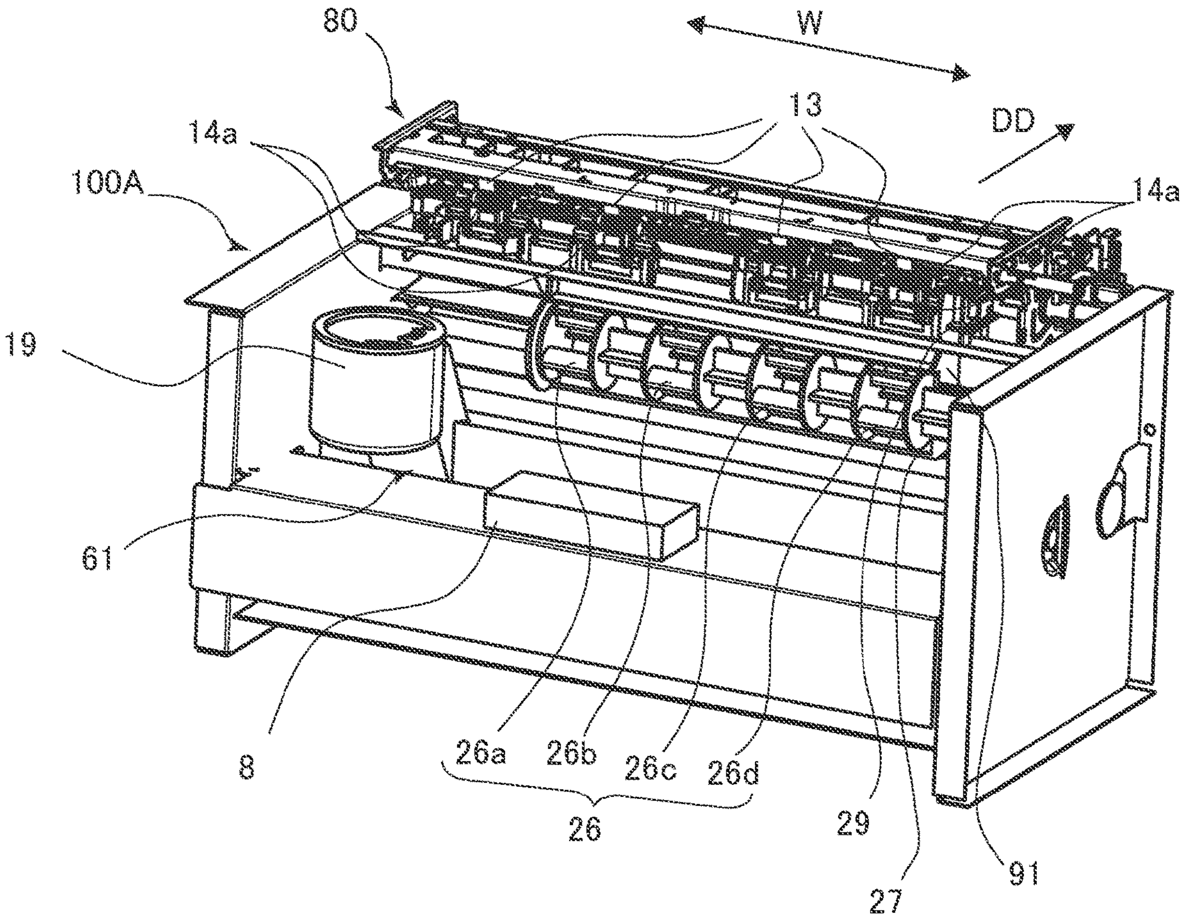
FIG. 3 is a perspective view illustrating an air blowing configuration.
Figure 4:
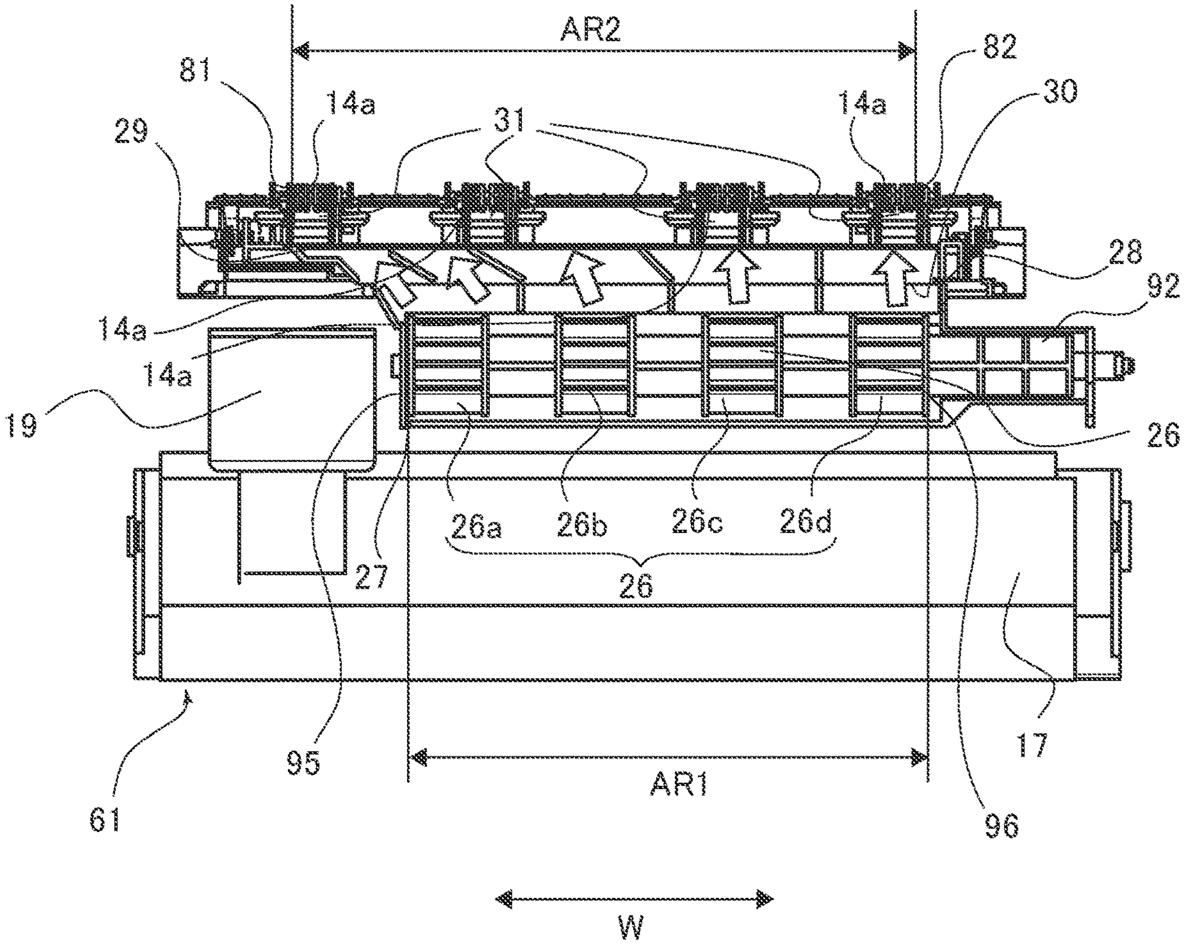
FIG. 4 is a front view illustrating the air blowing configuration.

Next, an air blowing configuration of the printer 100 will be described with reference to FIGS. 3 to 5. As illustrated in FIGS. 3 and 4, a duct 29 is disposed below the sheet discharge unit 80, and a fan holder 91 is disposed below the duct 29. An air intake port 27 of the fan holder 91 has a fan 26 disposed therein, formed of four impellers 26*a*, 26*b*, 26*c*, and 26*d*, and configured to blow air.

The casing 100A supports the fan holder 91, and the fan holder 91 rotatably supports a fan shaft 92. The four impellers 26*a*, 26*b*, 26*c*, and 26*d* forming the fan 26 are disposed side by side in the width direction W, and are fixed to the fan shaft 92. The fan shaft 92 is driven by a driving motor for driving the driving roller 13. By adopting a common driving motor, it is possible to contribute to miniaturization. When the fan shaft 92 rotates, the impellers 26*a*, 26*b*, 26*c*, and 26*d* rotate, and the air taken in from the air intake port 27 is sent into the fan holder 91.

Figure 5:
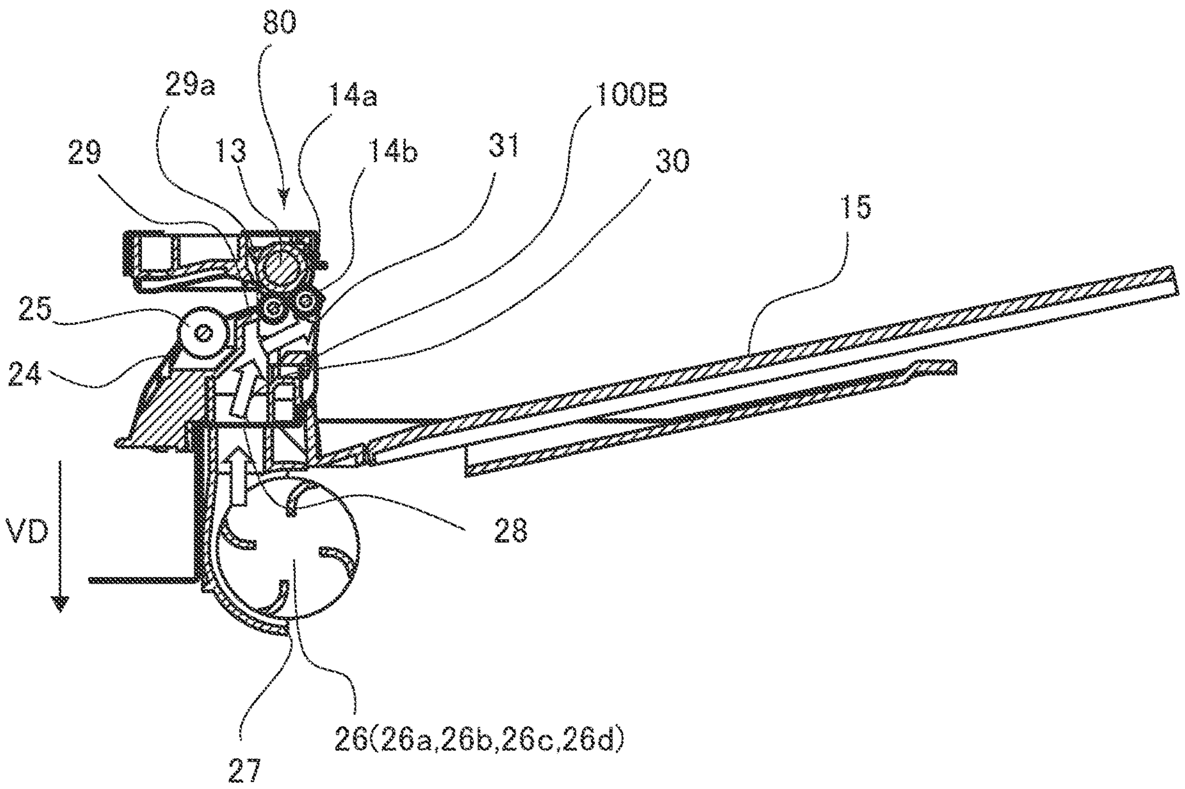
FIG. 5 is a cross-sectional view illustrating the air blowing configuration.

As illustrated in FIGS. 4 and 5, an air blow port 28 is provided at the upper end portion of the fan holder 91, and the air blow port 28 of the fan holder 91 faces an air intake port 30 of the duct 29. The air blow port 28 of the fan holder 91 and the air intake port 30 of the duct 29 may be directly connected to each other, or may be connected to each other by a connecting member made of rubber or the like. The air blow port 28 and the air intake port 30 may be separated from each other with a slight gap therebetween.

Air sent from the air blow port 28 of the fan holder 91 to the air intake port 30 of the duct 29 passes through the duct 29, and is guided toward an exhaust port 31 of the duct 29. Then, the air is discharged toward the sheet discharge tray 15 through the exhaust port 31. In the present embodiment, four driving rollers 13 and four driven rollers 14*a* and 14*b* are provided, and these rollers are disposed side by side in the width direction W orthogonal to the sheet conveyance direction CD (refer to FIG. 2).

As illustrated in FIG. 4, in the width direction W, an area AR1 in which the fan 26 is disposed is narrower than an area AR2 in which the rotary member and the driven roller 14*a* serving as a first driven roller are disposed. The area AR1 is an area in the width direction W in which the impellers 26*a*, 26*b*, 26*c*, and 26*d* are disposed, and is an area from a first end surface 95 in width direction W of the impeller 26*a* to a second end surface 96 in width direction W of the impeller 26*d*. The area AR2 is an area in the width direction W in which the four driven rollers 14*a* are disposed, and is an area from a first end surface 81 in the width direction W of the driven roller 14*a* disposed at a first end to a second end surface 82 in the width direction W of the driven roller 14*a* disposed at a second end. The area in the width direction W where the driven roller 14*b* serving as a second driven roller is disposed is the same as the area AR2. As illustrated in FIGS. 2 to 5, the respective driven rollers 14*a* and 14*b* are disposed so that at least a part of the driven rollers enters the inside of the duct 29. More specifically, the lower surfaces of the driven rollers 14*a* and 14*b* enter the inside of the duct 29, and the upper surfaces thereof protrude upwards from the duct 29. An opening portion 29*a* is formed in the duct 29 so that a part of the driven rollers 14*a* and 14*b* can enter the inside of the duct 29. A gap between the driven rollers 14*a* and 14*b* and the opening portion 29*a* is set to be as narrow as possible.

As described above, the air sent by the fan 26 is slightly diffused in the width direction W by the fan holder 91. Then, the air sent from the air blow port 28 of the fan holder 91 enters the air intake port 30 of the duct 29 and is further diffused in the width direction W toward the driven rollers 14*a* and 14*b*. The driven rollers 14*a* and 14*b* disposed so as to enter the inside of the duct 29 are cooled by air passing through the duct 29. The toner image formed on the sheet by the image forming unit 60 and heated by the heating unit 11 of the fixing unit 70 abuts on the upper surfaces of the driven rollers 14*a* and 14*b*. Since the driven rollers 14*a* and 14*b* are sufficiently cooled by the air sent from the fan 26, it is possible to reduce formation of image defects such as gloss unevenness in the toner image.

Further, the air is sent to the exhaust port 31 of the duct 29 and discharged from the exhaust port 31 toward the sheet discharge tray 15. Since there is almost no gap between the opening portion 29*a* of the duct 29 that the driven rollers 14*a* and 14*b* enter and the driven rollers 14*a* and 14*b*, the air passing through the duct 29 is hardly discharged from the opening portion 29*a* to the conveyance path CP.

Incidentally, it is known that extremely fine particles are generated by heating the toner wax or the fixing unit 70. The ultra fine particles (UFP) refer to particles having a diameter of 100 nm or less among suspended particulate matter (SPM). It has been found out that the ultra fine particles are mainly generated from silicone rubber used as an elastic layer of a pressurizing roller or the like. That is, when the silicone rubber is heated, a low molecular weight siloxane is generated, and this low molecular weight siloxane is emanated as ultra fine particles.

When the air sent by the fan 26 passes through the fixing nip F, the generated extremely fine particles are discharged to the outside of the printer 100 through the conveyance path CP. However, in the present embodiment, there is almost no gap between the driven rollers 14*a* and 14*b* and the opening portion 29*a*, and the duct 29 is provided with the exhaust port 31 communicating with the outside of the printer 100. Therefore, most of the air sent from the fan 26 is discharged from the exhaust port 31 to the outside of the printer 100 through the duct 29 without passing through the fixing nip F, thereby making it possible to reduce the amount of the extremely fine particles generated from the toner wax and the fixing unit 70 diffused to the outside of the printer 100.

Most of the air sent from the fan 26 is discharged from the exhaust port 31 toward the sheet discharge tray 15. Although four exhaust ports 31 of the present embodiment are provided in the duct 29 corresponding to the four driving rollers 13 and the four driven rollers 14*a* and 14*b*, respectively, the technology is not limited thereto. For example, the exhaust port 31 may be formed from one opening portion widened in the width direction W, or may be provided by being divided into two or three or four or more.

As illustrated in FIG. 5, the exhaust port 31 is provided in an exterior 100B of the printer 100, and is disposed between the sheet discharge unit 80 and the sheet discharge tray 15 in the vertical direction VD. When the sheet S is discharged from the sheet discharge unit 80, the toner image heated by the heating unit 11 of the fixing unit 70 is formed on the lower surface of the sheet S. Therefore, the air discharged from the exhaust port 31 can effectively cool the toner image formed on the lower surface of the sheet S discharged from the sheet discharge unit 80, and sticking of the sheets S stacked on the sheet discharge tray 15 can be suppressed.

As described above, the area AR1 in which the fan 26 is disposed is narrower than the area AR2 in which the driven rollers 14*a* and 14*b* are disposed. This is because the replenishing port 19 of the developer container 17 is disposed upstream of the fan 26 and the duct 29 in a removal direction DD of the process cartridge 61 (refer to FIGS. 1 and 3). The process cartridge 61 is removable in the removal direction DD in a state where a cover portion 100C provided on the back surface of the printer 100 is opened. That is, the fan 26 and the duct 29 are configured not to interfere with the process cartridge 61 when the process cartridge 61 is removed from the casing 100A in the removal direction DD. In other words, the fan 26 and the duct 29 are disposed so as not to interfere with the movement path of the process cartridge 61 when the process cartridge 61 is attached to and detached from the casing 100A.

More specifically, the replenishing port 19 is disposed so as not to overlap the first area AR1 and at least a part thereof is disposed so as to overlap the second area AR2 in the width direction W. By configuring the replenishing port 19, the fan 26, and the duct 29 in this manner, the process cartridge 61 can be smoothly attached and detached, and the printer 100 can be formed to be compact.

On the other hand, the air sent from the fan 26 is diffused in the width direction W by the fan holder 91 and the duct 29, and is guided to an entire area of the driven rollers 14*a* and 14*b*. That is, the air is diffused in the width direction W by the fan holder 91 and the duct 29 and guided to an entirety of the second area AR2. Thus, the driven rollers 14*a* and 14*b* can be sufficiently cooled. As described above, it is possible to improve maintainability of the process cartridge 61, downsize the printer 100, reduce the amount of extremely fine particles diffused from the printer 100, and reduce image defects such as gloss unevenness.

Second Embodiment

Next, a second embodiment of the present invention will be described. The second embodiment is a modification of the air blowing configuration of the first embodiment. Therefore, configurations similar to those of the first embodiment will be described by omitting illustration or attaching the same reference numerals to the drawings.

Air Blowing Configuration

Figure 6:
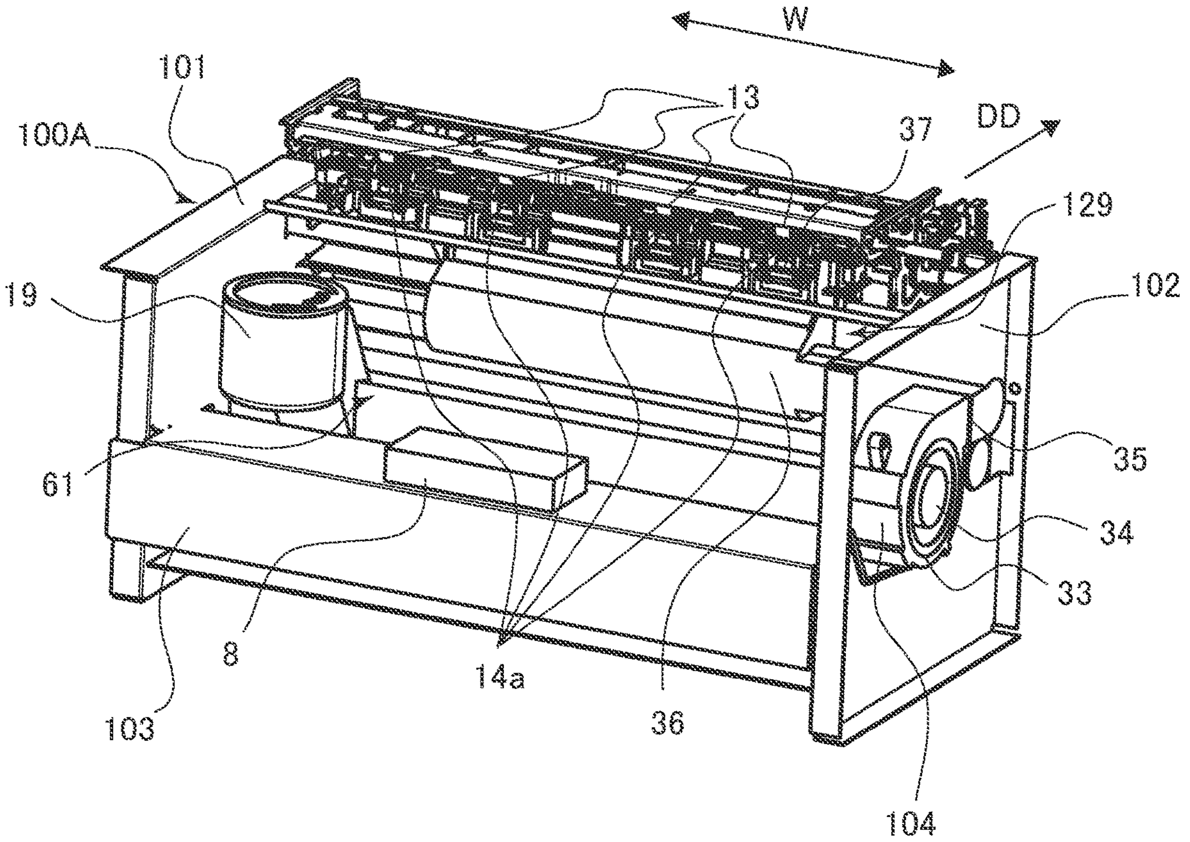
FIG. 6 is a perspective view illustrating an air blowing configuration according to a second embodiment.

As illustrated in FIG. 6, a casing 100A of the present embodiment includes side plates 101 and 102 disposed with a space therebetween in the width direction W, and a coupling member 103 that couples the side plates 101 and 102 and supports a laser scanner 8. A fan holder 104 is supported on the outer surface of the side plate 102, and the fan holder 104 accommodates and supports a fan 33 therein.

Figure 7:
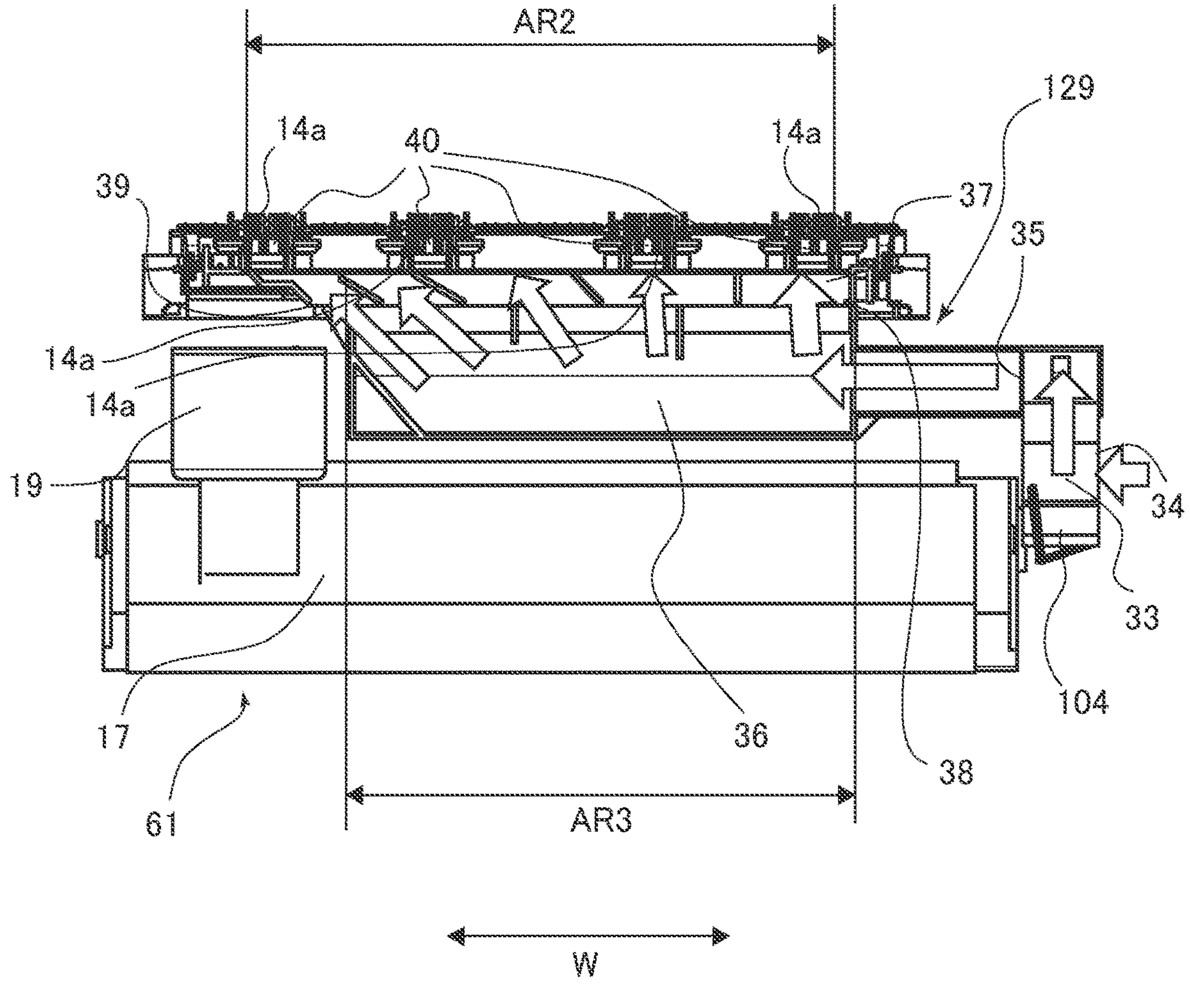
FIG. 7 is a front view illustrating the air blowing configuration.

The fan holder 104 is provided with an air intake port 34 through which the fan 33 takes in air and an air blow port 35 through which air sent by the fan 33 is discharged. A duct 129 is provided adjacent to the air blow port 35 of the fan holder 104. As illustrated in FIGS. 6 and 7, the duct 129 includes a first duct 36 and a second duct 37. The first duct 36 extends in the width direction W so as to penetrate the side plate 102, and is disposed so as to face the air blow port 35 of the fan holder 104.

The second duct 37 is disposed directly below driven rollers 14*a* and 14*b*, and has an air intake port 39 facing an exhaust port 38 of the first duct 36. The air blow port 35 of the fan holder 104 and the first duct 36 may be directly connected to each other, or may be connected to each other by a connecting member made of rubber or the like. The air blow port 28 and the air intake port 30 may be separated from each other with a slight gap therebetween. Similarly, the exhaust port 38 of the first duct 36 and the air intake port 39 of the second duct 37 may be directly connected to each other, or may be connected by a connecting member made of rubber or the like. In addition, the exhaust port 38 and the air intake port 39 may be separated from each other with a slight gap therebetween.

The air sent from the air blow port 35 of the fan holder 104 to the first duct 36 advances in the width direction W by the first duct 36. The air in the first duct 36 is sent from the exhaust port 38 to the air intake port 39 of the second duct 37. The air sent to the second duct 37 through the air intake port 39 passes through the second duct 37, and is guided toward an exhaust port 40 formed in the second duct 37. Then, as illustrated in FIG. 8, the air is discharged toward a sheet discharge tray 15 through the exhaust port 40.

As illustrated in FIG. 7, in the width direction W, the fan 33 is disposed outside an area AR2 in which the driven roller 14*a* is disposed. In the width direction W, the exhaust port 38 of the first duct 36 is disposed in an area AR3. The area AR3 is narrower than the area AR2.

Figure 8:
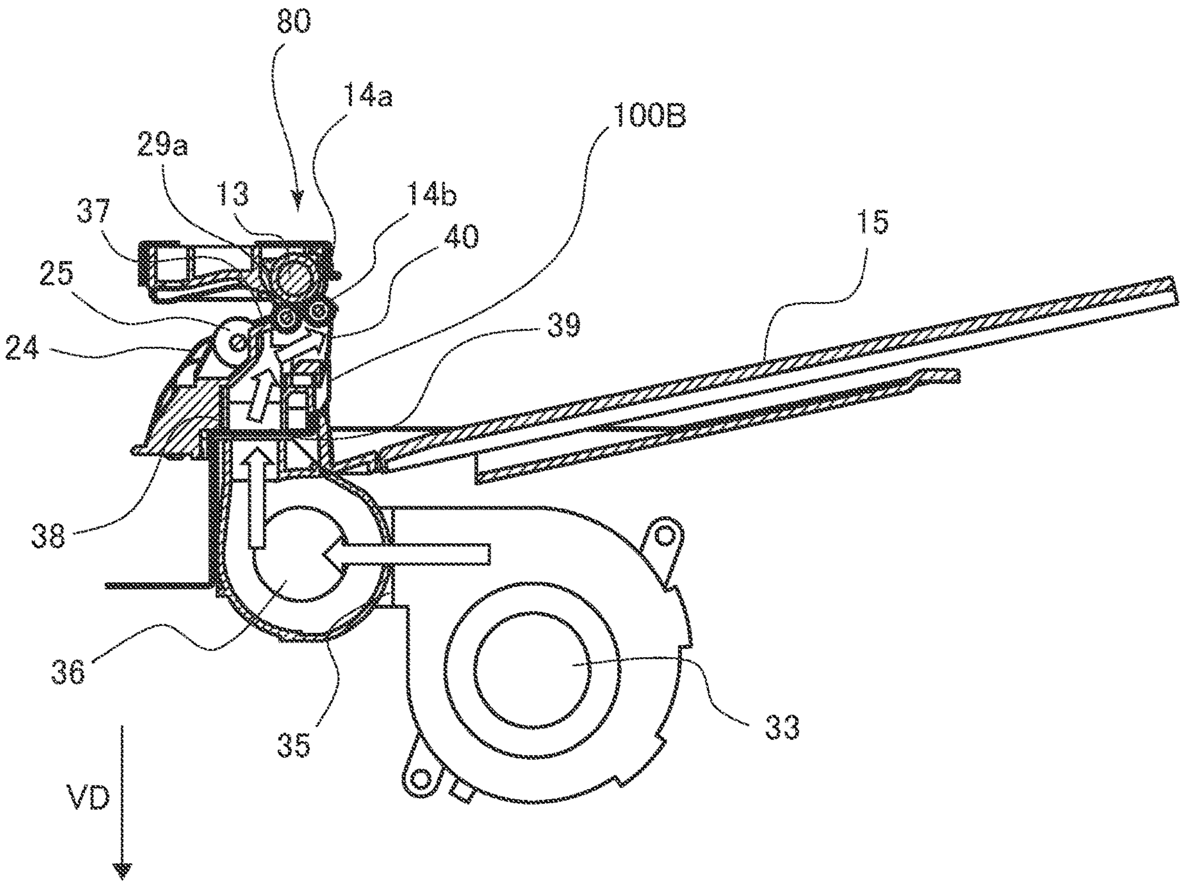
FIG. 8 is a cross-sectional view illustrating the air blowing configuration.

As illustrated in FIGS. 6 to 8, the driven rollers 14*a* and 14*b* are disposed so that at least a part of the driven rollers enters the inside of the second duct 37. More specifically, the lower surfaces of the driven rollers 14*a* and 14*b* enter the inside of the second duct 37, and the upper surfaces thereof protrude upwards from the second duct 37. An opening portion 29*a* is formed in the second duct 37 so that a part of the driven rollers 14*a* and 14*b* can enter the inside of the second duct 37. A gap between the driven rollers 14*a* and 14*b* and the opening portion 29*a* is set to be as narrow as possible.

The air entering the second duct 37 from the air intake port 39 is diffused in the width direction W toward the driven rollers 14*a* and 14*b*. The driven rollers 14*a* and 14*b* disposed to enter the second duct 37 are cooled by the air passing through the second duct 37. The toner image formed on the sheet by an image forming unit 60 and heated by a heating unit 11 of a fixing unit 70 abuts on the upper surfaces of the driven rollers 14*a* and 14*b*. Since the driven rollers 14*a* and 14*b* are sufficiently cooled by the air sent from the fan 33, it is possible to reduce formation of image defects such as gloss unevenness in the toner image.

Further, the air is sent to the exhaust port 40 of the second duct 37 and discharged from the exhaust port 40 toward the sheet discharge tray 15. Since there is almost no gap between the opening portion 29*a* of the second duct 37 that the driven rollers 14*a* and 14*b* enter and the driven rollers 14*a* and 14*b*, the air passing through the second duct 37 is hardly discharged from the opening portion 29*a* to the conveyance path CP (refer to FIG. 2).

When the air sent by the fan 33 passes through a fixing nip F, the generated extremely fine particles are discharged to the outside of the printer 100 through the conveyance path CP. However, in the present embodiment, there is almost no gap between the driven rollers 14*a* and 14*b* and the opening portion 29*a*, and the second duct 37 is provided with the exhaust port 40 communicating with the outside of the printer 100. Therefore, most of the air sent from the fan 33 is discharged from the second duct 37 to the outside of the printer 100 through the duct 129 without passing through the fixing nip F, thereby making it possible to reduce the amount of the extremely fine particles generated from the toner wax and the fixing unit 70 diffused to the outside of the printer 100.

Most of the air sent from the fan 33 is discharged from the exhaust port 40 toward the sheet discharge tray 15. Although four exhaust ports 40 of the present embodiment are provided in the second duct 37 corresponding to four driving rollers 13 and four driven rollers 14*a* and 14*b*, respectively, the technology is not limited thereto. For example, the exhaust port 40 may be formed from one opening portion widened in the width direction W, or may be provided by being divided into two or three or four or more.

As illustrated in FIG. 8, the exhaust port 40 is provided in the exterior 100B of the printer 100, and is disposed between a sheet discharge unit 80 and the sheet discharge tray 15 in the vertical direction VD. When the sheet S is discharged from the sheet discharge unit 80, the toner image heated by the heating unit 11 of the fixing unit 70 is formed on the lower surface of the sheet S. Therefore, the air discharged from the exhaust port 40 can effectively cool the toner image formed on the lower surface of the sheet S discharged from the sheet discharge unit 80, and sticking of the sheets S stacked on the sheet discharge tray 15 can be suppressed.

As described above, the fan 33 is disposed outside the area AR2 in which the driven rollers 14*a* and 14*b* are disposed. The area AR3 in which the exhaust port 38 of the first duct 36 is disposed is narrower than the area AR2 in which the driven rollers 14*a* and 14*b* are disposed. This is because the replenishing port 19 of the developer container 17 is disposed upstream of the duct 129 in the removal direction DD of the process cartridge 61 (refer to FIGS. 1 and 6). That is, the fan 33 and the duct 129 are configured not to interfere with the process cartridge 61 when the process cartridge 61 is removed from the casing 100A in the removal direction DD. In other words, the fan 33 and the duct 129 are disposed so as not to interfere with the movement path of the process cartridge 61 when the process cartridge 61 is attached to and detached from the casing 100A.

More specifically, the replenishing port 19 is disposed so as not to overlap the third area AR3 and at least a part thereof is disposed so as to overlap the second area AR2 in the width direction W. In addition, the fan 33 is smaller than the fan 26 of the first embodiment in the width direction W, and has, for example, one impeller. By configuring the replenishing port 19, the fan 33, and the duct 129 in this manner, the process cartridge 61 can be smoothly attached and detached, and the printer 100 can be formed to be compact.

On the other hand, the air sent from the fan 33 is diffused in the width direction W by the fan holder 104 and the duct 129, and is guided to an entire area of the driven rollers 14*a* and 14*b*. That is, the air is diffused in the width direction W by the fan holder 104 and the duct 129 and guided to an entirety of the second area AR2. Thus, the driven rollers 14*a* and 14*b* can be sufficiently cooled. As described above, it is possible to improve maintainability of the process cartridge 61, downsize the printer 100, reduce the amount of extremely fine particles diffused from the printer 100, and reduce image defects such as gloss unevenness.

Other Embodiments

In any of the embodiments described above, the heater 21 is in direct contact with the fixing film 20, but the technology is not limited thereto. For example, the heater 21 may be in contact with the fixing film 20 via a sheet material having high thermal conductivity such as iron alloy or aluminum.

In any of the embodiments described above, the heating unit 11 is configured to be brought into pressure contact with the pressurizing roller 12 by a pressurizing spring (not illustrated), but the technology is not limited thereto. For example, the heating unit 11 may be fixed to the casing, and the pressurizing roller 12 may be movably supported with respect to the casing and may be brought into pressure contact with the heating unit 11 by the pressurizing spring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100482, filed Jun. 22, 2022, which is hereby incorporated by reference herein in its entirety.

What is claimed is:

1. An image forming apparatus comprising:
- an image forming unit configured to form a toner image on a sheet;
- a heating unit including:
  - a heating element; and
  - a heating rotary member configured to incorporate the heating element and to be rotatable;
- a pressurizing rotary member configured to form, together with the heating unit, a fixing nip that fixes the toner image formed by the image forming unit to the sheet;
- a sheet discharge unit including a rotary unit disposed downstream of the fixing nip in a sheet conveyance direction, the sheet discharge unit discharging the sheet to an outside of the image forming apparatus, the rotary unit including bodies configured to abut the sheet and being disposed side by side in a width direction orthogonal to the sheet conveyance direction;
- a stacking unit configured to stack the sheet discharged by the sheet discharge unit;
- a fan configured to blow air, the fan including a rotation shaft extending in the width direction; and
- a duct configured to discharge the air sent by the fan toward the stacking unit,
- wherein the rotary unit is disposed such that at least a part of the rotary unit enters an inside of the duct, and
- wherein, with respect to the width direction, at least a part of a first area in which the fan is disposed overlaps a second area in which the rotary unit is disposed.

2. The image forming apparatus according to claim 1, wherein the duct is disposed below the sheet discharge unit,
- wherein a lower surface of each of the bodies enters the inside of the duct, and an upper surface of each of the bodies protrudes upwards from the duct, and
- wherein the upper surface of each of the bodies is configured to abut the toner image formed on the sheet.

3. The image forming apparatus according to claim 1, wherein the duct includes an opening portion, and
- wherein each of the bodies enters the inside of the duct through the opening portion.

4. The image forming apparatus according to claim 1, wherein the sheet discharge unit includes a driving roller, and
- wherein each of the bodies is a driven roller that is driven to rotate by the driving roller.

5. The image forming apparatus according to claim 4, wherein the driven roller is a first driven roller,
- wherein the sheet discharge unit includes a second driven roller disposed downstream of the first driven roller in the sheet conveyance direction and configured to be driven to rotate by the driving roller, and
- wherein the second driven roller is disposed such that at least a part of the second driven roller enters the inside of the duct.

6. The image forming apparatus according to claim 1, wherein the duct includes an exhaust port formed in an exterior of the image forming apparatus and configured to discharge the air sent by the fan, and
- wherein the exhaust port is disposed between the sheet discharge unit and the stacking unit in a vertical direction.

7. The image forming apparatus according to claim 6, wherein, with respect to the width direction, at least a part of the first area overlaps a third area in which the exhaust port is disposed.

8. The image forming apparatus according to claim 1, wherein a length of the first area is narrower than a length of the second area in the width direction, and
- wherein the duct is configured to guide the air sent by the fan to an entirety of the second area.

9. The image forming apparatus according to claim 8, wherein the image forming unit includes a developer container including a storage unit configured to store a toner,
- wherein the developer container includes a replenishing port configured to replenish a toner in the storage unit,
- wherein the replenishing port is disposed so as not to overlap the first area in the width direction, and
- wherein at least a part of the replenishing port is disposed so as to overlap the second area in the width direction.

10. The image forming apparatus according to claim 9, wherein the image forming unit includes a cartridge including the developer container,
- wherein the image forming apparatus further comprises a casing configured to detachably support the cartridge, and
- wherein the replenishing port is disposed upstream of the duct in a removal direction in which the cartridge is removed from the casing.

11. The image forming apparatus according to claim 10, wherein the fan and the duct are disposed so as not to interfere with a movement path of the cartridge, the movement path being a movement path in a case where the cartridge is attached to and detached from the casing.

12. The image forming apparatus according to claim 8, wherein the fan includes a plurality of impellers disposed in parallel in the width direction.

13. An image forming apparatus comprising:

an image forming unit configured to form a toner image on a sheet;

a heating unit including:

a heating element; and a heating rotary member configured to incorporate the heating element and to be rotatable;

a pressurizing rotary member configured to form, together with the heating unit, a fixing nip that fixes the toner image formed by the image forming unit to the sheet;

a sheet discharge unit including a rotary unit disposed downstream of the fixing nip in a sheet conveyance direction and configured to abut the sheet, the sheet discharge unit discharging the sheet to an outside of the image forming apparatus;

a stacking unit configured to stack the sheet discharged by the sheet discharge unit;

a fan configured to blow air; and a duct configured to discharge the air sent by the fan toward the stacking unit, wherein the rotary unit is disposed such that at least a part of the rotary unit enters an inside of the duct, wherein the fan is disposed outside an area in which the rotary member is disposed in a width direction orthogonal to the sheet conveyance direction, wherein the duct is configured to guide the air sent by the fan to an entirety of the area, wherein the image forming unit includes a cartridge including a storage unit configured to store a toner, wherein the cartridge includes a replenishing port configured to replenish a toner in the storage unit, and wherein at least a part of the replenishing ports is disposed so as to overlap the area in the width direction.

14. The image forming apparatus according to claim 13, further comprising a casing configured to detachably support the cartridge, wherein the replenishing port is disposed downstream of the fan and the duct in a removal direction in which the cartridge is removed from the casing.

15. The image forming apparatus according to claim 14, wherein the fan and the duct are disposed so as not to interfere with a movement path of the cartridge, the movement path being a movement path in a case where the cartridge is attached to and detached from the casing.

16. An image forming apparatus comprising:

an image forming unit configured to form a toner image on a sheet;

a heating unit including:

a heating element; and a heating rotary member configured to incorporate the heating element and to be rotatable;

a pressurizing rotary member configured to form, together with the heating unit, a fixing nip that fixes the toner image formed by the image forming unit to the sheet;

a sheet discharge unit including a rotary unit disposed downstream of the fixing nip in a sheet conveyance direction and configured to abut the sheet, the sheet discharge unit discharging the sheet to an outside of the image forming apparatus;

a stacking unit configured to stack the sheet discharged by the sheet discharge unit;

a fan configured to blow air; and a duct configured to discharge the air sent by the fan toward the stacking unit, wherein the rotary unit is disposed such that at least a part of the rotary unit enters an inside of the duct, wherein a first area in which the fan is disposed is narrower than a second area in which the rotary unit is disposed in a width direction orthogonal to the sheet conveyance direction, wherein the duct is configured to guide the air sent by the fan to an entirety of the second area, wherein the image forming unit includes a cartridge including a storage unit configured to store a toner, wherein the cartridge includes a replenishing port configured to replenish a toner in the storage unit, wherein the replenishing port is disposed so as not to overlap the first area in the width direction, and wherein at least a part of the replenishing port is disposed so as to overlap the second area in the width direction.

17. The image forming apparatus according to claim 16, further comprising a casing configured to detachably support the cartridge, wherein the replenishing port is disposed upstream of the duct in a removal direction in which the cartridge is removed from the casing.

18. The image forming apparatus according to claim 17, wherein the fan and the duct are disposed so as not to interfere with a movement path of the cartridge, the movement path being a movement path in a case where the cartridge is attached to and detached from the casing.

* * * * *